United States Patent
Bartsch et al.

(10) Patent No.: US 8,009,881 B2
(45) Date of Patent: Aug. 30, 2011

(54) DIGITIZATION OF A PAPILLARY STRUCTURE

(75) Inventors: Armin Bartsch, Gröbenzell (DE); Elmar Stephan, Munich (DE)

(73) Assignee: Giesecke & Devrient GmbH, Munich (DE)

( * ) Notice: Subject to any disclaimer, the term of this patent is extended or adjusted under 35 U.S.C. 154(b) by 1119 days.

(21) Appl. No.: 10/580,934

(22) PCT Filed: Nov. 25, 2004

(86) PCT No.: PCT/EP2004/013385
§ 371 (c)(1), (2), (4) Date: Mar. 13, 2007

(87) PCT Pub. No.: WO2005/055429
PCT Pub. Date: Jun. 16, 2005

(65) Prior Publication Data
US 2007/0258629 A1    Nov. 8, 2007

(30) Foreign Application Priority Data
Dec. 2, 2003  (DE) .................................. 103 56 147

(51) Int. Cl.
G06K 9/00 (2006.01)
H03M 1/00 (2006.01)
G05B 19/00 (2006.01)
G05B 23/00 (2006.01)
G06F 7/00 (2006.01)
G06F 7/04 (2006.01)
G08B 29/00 (2006.01)
G08C 19/00 (2006.01)
H04B 1/00 (2006.01)
H04B 3/00 (2006.01)
H04Q 1/00 (2006.01)
H04Q 9/00 (2006.01)

(52) U.S. Cl. ........ 382/124; 382/115; 382/125; 382/128; 382/170; 382/171; 902/3; 341/126; 340/5.81; 340/5.82; 340/5.83

(58) Field of Classification Search .................... None
See application file for complete search history.

(56) References Cited

U.S. PATENT DOCUMENTS
4,393,372 A    7/1983    Hoehn
(Continued)

FOREIGN PATENT DOCUMENTS
EP    1 215 620 A2    6/2002
(Continued)

OTHER PUBLICATIONS

Morimura H. et al., "A Pixel-Level Automatic Calibration Circuit Scheme for Sensing Initialization of a Capacitive Fingerprint Sensor LSI", 2001 Symposium on VLSI Circuits Digest of Technical Papers, Kyoto, Japan, Jun. 14-16, 2001, Tokyo: JSAP, Japan, Jun. 14, 2001 pp. 171-174, XP010551530, ISBN: 4-89114-014-3, the whole document.

Khalid Sayood, "Introduction to Data Compression", 2000, Morgan }Kaufmann, San Francisco 226380, XP002324270, ISBN: 1-55860-558-4, Chapter 8: Scalar Quantization.

(Continued)

Primary Examiner — Tom Y Lu
Assistant Examiner — Thomas Conway
(74) Attorney, Agent, or Firm — Bacon & Thomas, PLLC

(57) ABSTRACT

A method and apparatus is described for recording and digitizing intensity profiles (IP) of the papillary structure of the skin with high intensity resolution using sensors S with low intensity resolution. For this purpose, a plurality of digital image signals (DS, DS1, DS2) of an identical subarea e.g. of a fingerprint are recorded, whereby the continuous intensity domain (KI) of the fingerprint is scanned in different intensity resolutions, and/or different portions (A1, A2) of said continuous intensity domain (KI) are mapped to discrete intensity domains of the single digital image signals (DS, D1, DS2). By the pixelwise combination of all digital image signals (DS, DS1, DS2), a digital fingerprint image signal (PS) is finally produced whose discrete intensity domain (DI) represents a larger portion of the continuous intensity domain (KI) of the fingerprint and/or has a higher resolution intensity than each single one of the digital image signals (DS, DS1, DS2).

22 Claims, 2 Drawing Sheets

U.S. PATENT DOCUMENTS

| | | | |
|---|---|---|---|
| 6,028,543 A * | 2/2000 | Gedcke et al. | 341/131 |
| 6,259,804 B1 * | 7/2001 | Setlak et al. | 382/124 |
| 2002/0057845 A1 * | 5/2002 | Fossum et al. | 382/270 |

FOREIGN PATENT DOCUMENTS

| | | |
|---|---|---|
| WO | 98/50879 A2 | 11/1998 |
| WO | 03/096263 A1 | 11/2003 |

OTHER PUBLICATIONS

"Lexikon, Fachgebietsabonnement Physik and Technik" 'Online', Apr. 12, 2005, Elsevier/Spektrum Akademischer Verlas, Heidelb Erg, XP002324271, Retrieved from the Internet: URL:http://www.wissenschaft-online.de/abo/lexikon/physik/492} 'retrieved on Apr. 12, 2005, the whole document (with clear copy of text downloaded Dec. 17, 2007).

* cited by examiner

DIGITIZATION OF A PAPILLARY STRUCTURE

This invention relates to a method and apparatus for digitizing at least a subarea of the papillary structure of the skin, in particular a fingerprint, with high intensity resolution.

Methods and apparatuses of this kind can be used commercially in diverse ways, for example in the biometric identification of persons, or access control for protected rooms, e.g. in companies, airports or other security-critical buildings.

Sensors for digitizing fingerprints have certain technical limits for the resolution of both the space domain and the value domain of the papillary structure of a fingerprint, whereby the value domain can be a brightness or intensity domain or a color domain depending on the recording modality. Since with common color spaces the colors are represented as intensity tuples of different spectral ranges, the term "intensity" will hereinafter refer equally to a brightness intensity and a color intensity.

The resolution of a sensor when mapping a natural (continuous) intensity domain to the (discrete) gray levels of a digital image is limited by the signal-to-noise ratio of the sensor due to various technical and natural noise sources (e.g. quantum or detector noise). This means that the smallest intensity interval resolvable by the sensor depends decisively on the signal-to-noise ratio of the sensor used. The resulting-theoretical-intensity resolution limits the best possible scanning of the intensity domain to be detected by the sensor (quantization) and thus determines the maximum bit number necessary for coding an intensity value upon analog/digital conversion of the image signal (the depth of intensity or color).

With many sensors, however, the intensity resolution of a digital image signal given by the analog/digital conversion is below the intensity resolution that would be possible on the basis of the signal-to-noise ratio of the sensor. This non-optimal quantization is very disadvantageous particularly in the digital recording of e.g. fingerprint images for the purpose of archival and digital image comparison, since such a technically unnecessary restriction of intensity resolution can entail serious information losses which can result in characteristic detail structures of a fingerprint not being sensed by its digital recording. This disadvantage manifests itself in particular when structures with great intensity or color dynamics are to be recorded, since in such structures a single discrete intensity value of the digital recording represents a large continuous intensity interval of the structure to be recorded.

To provide an at least partly improved intensity resolution, some sensors have a restricted sensitivity, so that they only detect a portion of the intensity domain available. This permits an increased intensity resolution in the portion in question, but the intensities beyond the selected portion are located in the saturation region of the sensor and are therefore not detected. All points of the object to be recorded whose real intensity values are not located within the portion are then mapped to either the minimum or maximum intensity value of the digital image signal (i.e. its saturation values) and thus lose their differentiated information. Such sensors can as a rule not be used in the digital recording of fingerprint images, since the fingerprints of different persons are usually to be found in extremely different intensity and color domains and therefore the full intensity dynamics must be detected.

With many such sensors, certain recording parameters are adjustable, such as the portion of the intensity domain to be recorded or the contrast of the image. This fundamentally permits an adaption to the recording conditions, but the readjustment of the recording parameters is an exceptionally time-consuming procedure, on the one hand, and only leads to the desired comparability of recorded images with archived reference images with considerable algorithmic effort, on the other hand.

It would of course also be possible to use sensors with a sufficiently high intensity resolution for the purpose of digitally recording fingerprint images, but such sensors have the disadvantage of sometimes substantially higher costs compared to conventional sensors.

SUMMARY

Therefore, the present invention is based on the problem of improving in simple and reasonably priced fashion the digitization results of sensors that scan an image to be digitized with a low intensity or color resolution.

This problem is solved according to the invention by a method and apparatus having the features of the independent claims. Advantageous embodiments and developments of the invention are stated in dependent claims.

The recording and digitization of articles and objects is done as a rule in two steps: first a physical signal (e.g. the local contrast resulting from the papillary structure of a fingerprint profile, or any other electromagnetic signals) is transformed into an analog electrical signal which is then transformed into a digital signal by means of an analog/digital converter (A/D converter). In the A/D conversion both the continuous space domain and the continuous intensity domain of the analog signal are mapped to limited domains having a finite number of discrete values. Thus, a space discretization and an intensity discretization are effected, the latter also being referred to as quantization.

In the digital recording of fingerprints, the intensity profile of a certain subarea of the papillary structure of the skin is recorded by means of suitable sensors. The continuous intensity domain of the intensity profile or a portion of said intensity domain is thereby discretized and represented by a finite number of discrete intensity values of the digital image. A digital 8-bit image has for example 256 discrete intensity values which each represent a certain continuous intensity interval.

According to the invention, a plurality of recordings are made of a fingerprint to be recorded which all image the same subarea of the papillary structure of the skin and thus have the same image content structurally but differ quantitatively in the representation of said content by discrete intensity values. The recording of largely identical image areas can be ensured very simply by a high recording frequency of the sensor, so that movement artifacts are very largely excluded.

The different representation mode of the repeatedly recorded image content is ensured by effecting different intensity discretizations (quantizations) in each case. For example, the continuous intensity domain of the intensity profile can be discretized with different resolutions, and/or different portions of the continuous intensity domain can be discretized instead of the total domain.

Each single one of this plurality of image signals of the same papillary subarea represents, due to its different intensity discretization, specific information about the actual (continuous) intensity structure of the recorded fingerprint profile, which differs at least partly from the information content of all other image signals of the same papillary subarea. A pixelwise combination of all these structurally identical digital recordings results in a digital papillary structure signal which integrates the discrete intensity domains of all digital image signals and therefore has a discrete intensity domain with increased resolution for each discrete pixel.

The advantage of this method is that conventional and reasonably priced sensors can be used to obtain upon digitization an intensity resolution that exceeds the intensity resolution of single image signals and whose quality is suitable e.g. for the purpose of digitally recording fingerprint profiles.

With the variations of intensity discretization there are in particular the two following fundamental possibilities: either digital image signals can be produced whose discrete intensity domains cover different portions of the continuous intensity domain, or a constant intensity domain of the intensity profile can be detected and then represented with different numbers of discrete intensity values. Furthermore, it is also possible in a hybrid method that different portions of the continuous intensity domain are mapped to different numbers of discrete intensity values of the digital single images in each case.

The first-mentioned embodiment has the advantage that the digital papillary structure signal which is combined from the image signals maps a larger portion of the continuous intensity domain of the fingerprint profile than the intensity domains of the single image signals, since the different portions complete each other to form a larger portion. Thus, accordingly larger portions of the continuous intensity domain of the papillary structure are advantageously detected with the same intensity resolution with which the accordingly smaller portions of the single image signals were already detected. Altogether, this increases the intensity resolution of the papillary structure signal maximally by a factor that is determined by the number of image signals.

To detect as large a portion as possible of the continuous intensity domain of the intensity profile, it is advantageous to select the portions detected by the single image signals so that they do not overlap. To be able to detect contiguous portions, it is further expedient that the nonoverlapping portions of the image signals are directly adjacent. Said nonoverlapping and adjacent portions advantageously map the total continuous intensity domain completely. Altogether, the advantages of the hitherto described, first embodiment are that the total intensity dynamics of the intensity profile of the papillary structure can be detected, thereby permitting simple adaption to different persons and lighting conditions.

In an advantageous embodiment, the intensity domain portions detected by the single image signals can overlap. This procedure has advantages particularly when important discriminative features of the fingerprint occur in certain intensity domain segments within the continuous intensity domain of the fingerprint profile, which must correspondingly be detected with a high intensity resolution for optimal feature extraction. Such intensity domain segments are then recorded overlappingly by different image signals.

Thus if, using two digital image signals, the continuous intensity intervals represented by their discrete intensity values overlap, this results in smaller (e.g. half as large) intensity intervals which are represented by their own, more exact discrete intensity values. Said more exact intensity values then result from the two discrete intensity values of the overlapping intervals. In this case, there is twice the intensity resolution in the relevant segments of the continuous intensity domain. This is particularly advantageous for optimally detecting those segments of an intensity domain where the local intensity maxima and minima important for later evaluation of the digitized fingerprint profiles are located.

In an inventive apparatus for digitization, the portion of the continuous intensity domain for intensity discretization is determined by a corresponding control device. Said control device can intervene in the digitization process fundamentally at two different places upon determination of an intensity portion. In a preferred embodiment of the invention, a portion is already specified upon transformation of the (physical) intensity profile into an analog electrical signal, that is, via a corresponding control signal of the control device to the appropriate signal converter. On the other hand, according to an alternative embodiment, the portion can only be determined in the following step of analog/digital conversion by means of a corresponding control signal to the A/D converter.

It is preferable to use a capacitive sensor consisting of a matrix of capacitor plates to which a certain quantity of charge is applied. The capacitors then measure, in dependence on the applied quantity of charge, the local distance from the fingerprint profile functioning as the second capacitor plate as a proportional voltage signal. By variation of the applied quantity of charge, the portion of the intensity domain of the fingerprint profile detected by the sensor can be determined. Besides capacitive sensors, it is also possible in further embodiments to use for the same purpose e.g. optical sensors, for example CCD sensors, whose photodiodes convert light photons into an electrical signal.

In the second-mentioned embodiment, the same intensity domain of the fingerprint profile is detected by a plurality of digital image signals and represented with different numbers of discrete intensity values, i.e. different intensity resolutions. This embodiment has the advantage that, analogously to the above-described effect with overlapping intensity portions, the continuous intensity domain is represented by more discrete intensity values in the digital papillary structure signal combined from the plurality of image signals than in the single digital image signals. If the continuous intensity intervals represented by the discrete intensity values of two image signals do not form real subsets, the continuous intensity intervals represented by the respective discrete intensity values of the single image signals are shifted slightly against each other and form intersecting areas.

By combining the two hitherto described embodiments it is possible, in a particularly advantageous third embodiment, to detect different portions of the continuous intensity domain with different resolutions in each case. The intensity discretization is thus particularly flexible, since the resolution of any intensity intervals can be adjusted specifically. This adjustment of the particular portions and resolutions to be advantageously selected is performed by the control device which controls the recording and digitization of the single image signals.

Uniting all image signals into a papillary structure signal with increased intensity resolution is realized by a combination device. The discrete intensity values of the image signals to be combined have no more information about the continuous intensity intervals actually represented by them. Thus, e.g. a digital 8-bit image always has the gray values 0 to 255, regardless of the continuous intensity portion actually covered by it. Therefore, in case the single image signals only detect portions of the intensity domain of the fingerprint profile, for correct combination of the digital image signals their intensity domains must, in a first step, be normalized to the detected continuous intensity portion.

In a second step, for each discrete pixel of the digital papillary structure signal to be produced, an intensity value is estimated which results from the intensity values of the discrete pixels of the single image signals which are located at the particular positions corresponding to the appropriate pixel.

A precondition for this step is that the subareas of the fingerprint profile mapped by the single image signals overlap in each case exactly enough so that mutually corresponding discrete image positions of the image signals map the same structures in each case. This can be ensured, except for an obligatory noise component, by an accordingly high recording frequency. Nevertheless, smaller shifts in the space domain can also be subsequently compensated algorithmically, for example by correlation operations in the space or frequency domain of the digital image signals.

In an advantageous embodiment, the estimated value is calculated by forming the arithmetic mean of the corresponding intensity values of the single image signals. This has the advantage that more exact intensity values including the intensity values of all image signals with equal status are calculated for the papillary structure signal. Furthermore, other estimation procedures are also conceivable, however, such as weighted averaging, for example to give greater weight to high-resolution intensity values upon estimation.

The hitherto described methods can be used particularly advantageously in an extended embodiment also for producing digital color images of a fingerprint profile with increased color resolution. For this purpose, it is possible to use special color sensors that detect the spectrum of visible light according to known additive or subtractive color spaces (e.g. RGB, CMY) separated into spectral bands according to primary colors to be mixed. The portions and resolutions of the (generally three) continuous color domains to be determined by the adjusting device can be specified independently of each other or in correlation with each other. The uniting of the particular discrete color domains of the single color image signals into one color domain, in each case, of the multispectral papillary structure signal by the combination device will then be effected as a rule separately from each other in the same way as the uniting of intensity domains. The use of two color image signals with three spectral bands each would then, in the optimal case, result in a $2^3$=8-fold improved color resolution of the papillary structure color signal. This method can furthermore be used for many further color spaces (e.g. HSV and HLS).

In a further embodiment of the invention, only those intensity values of the image signals are taken into account, upon estimation of the intensity values of the papillary structure signal, that do not correspond to the minimal or maximal discrete intensity value—that is, one of the saturation values—of the particular intensity portion. For said values do not represent the intensities covered by the particular portions of the continuous intensity domain and could therefore distort the particular estimation. This undesirable effect is advantageously avoided by the preventative exclusion of the saturated intensity values.

In a particularly advantageous fourth embodiment, binary image signals are recorded, i.e. ones having only two different discrete values, e.g. 0 or "black" and 1 or "white". For this purpose, the continuous intensity domain of the fingerprint profile to be mapped is partitioned, by means of a threshold value to be specified by the control device, into a bright and a dark subdomain which are each represented by one of the two intensity values of a binary image signal. All bright intensity values of the fingerprint profile that are above the threshold value are represented in the binary image by the color "white", while the dark intensity values below the threshold value are represented by the color "black".

The respective threshold value for defining a white and a black intensity interval is first set low by the control device, upon production of a sequence of binary image signals, and increased successively in the course of this process so that the share of black pixels in the binary images also increases successively. At a high number of binary images, this incremental scanning of the continuous intensity domain ensures an accordingly high intensity resolution in the digital papillary structure signal. The binary images must finally only be added up by the combination device to produce the corresponding papillary structure signal. Thus, a papillary structure signal with n+1 different intensity values can be produced by recording n binary images.

The special advantage of this fourth embodiment is that particularly simple and economical binary sensors can be used for producing a sufficient intensity resolution. Likewise, the above-described capacitive sensors can be used by a binary image sequence with an increasing black/white share being produced by means of the control device via increasing/decreasing quantities of charge on the capacitor plates, at a fixed adjustment of the A/D converter.

All described methods and embodiments can be used both for two-dimensional image signals and for one-dimensional time signals. It is thus also possible to increase the value resolution of a time signal analogously by the inventive methods and apparatuses.

Further features and advantages of the invention will result from the following description of different exemplary embodiments and alternative embodiments according to the invention. Reference is made to the figures, which show:

DETAILED DESCRIPTION OF VARIOUS EMBODIMENTS

Figure 1:
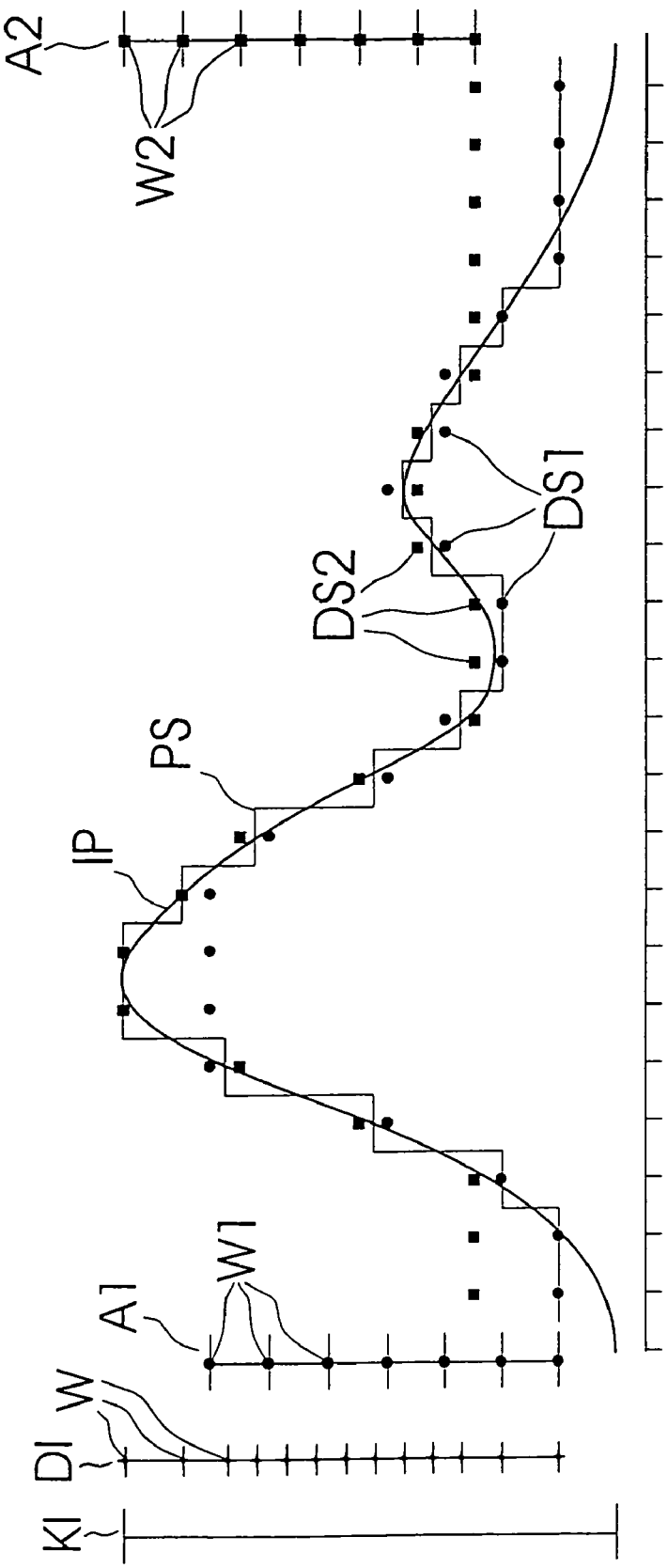
FIG. 1 a diagram of the method for increasing the intensity resolution according to the first inventive embodiment (combining image signals detecting different intensity domain portions), whereby the intensity domain portions overlap, and FIG. 2 a diagram of an apparatus for increasing the intensity resolution by combining binary image signals according to the fourth inventive embodiment.

FIG. 1 shows schematically a diagram of a continuous intensity profile IP which can be interpreted for example as a one-dimensional extraction of a two-dimensional continuous intensity profile of a subarea of a fingerprint. The dimension reduction serves only to better illustrate the inventive method, which is also applicable to a two-dimensional image signal in identical fashion and with an identical effect. This exemplary embodiment is further not restricted to intensity images, but is equally applicable to multispectral images by the single spectral or color bands being treated separately in the way described hereinafter.

As the first step of digitization of the continuous intensity profile IP, a conventional sensor (or a plurality of different sensors) are first used to produce two digital signals DS1 and DS2 which, because of the limited intensity resolution of the sensor, each detect only the portions A1 and A2 of the continuous intensity domain KI of the intensity profile IP and represent them by 7 different discrete intensity values W1, W2 in each case. This means that the relevant portions A1, A2 are discretized with the same resolution. Since the two intensity domain portions A1, A2 of the two signals DS1, DS2 each do not detect the total continuous intensity domain KI, certain areas of the continuous intensity profile IP are located in the particular saturation regions of the digital signals DS1, DS2, that is, beyond the corresponding intensity domain portions A1, A2. For example, with the digital signal DS1 the intensity maximum of the intensity profile IP is not detected with sufficient exactness, while with the digital signal DS2 the intensity minima of the intensity profile IP are located in the saturation region and are therefore not detected by the signal DS2.

The portions A1, A2 of the two digital signals DS1, DS2 are selected in such a way that they overlap and the respective discrete intensity values W1, W2 are slightly shifted against each other. Therefore, the combination of the two digital signals DS1, DS2 or their intensity domain portions A1, A2 forms a combined papillary structure signal PS with an accordingly larger discrete intensity domain DI and with an intensity resolution, increased over the digital signals DS1, DS2, of altogether 2*7−1=13 different discrete intensity values W. The resulting digital papillary structure signal PS is shown in FIG. 1 as a staircase signal. The intensity values W derived from the nonoverlapping areas of the intensity portions A1, A2 correspond to the particular intensity values W1, W2 of the relevant digital signal DS1, DS2. From the overlapping area, however, the intensity values W are calculated as averages of the particular adjacent discrete intensity values W1, W2 of the intensity domain portions A1, A2.

This different procedure for the overlapping area and the non-overlapping areas excludes the saturated signal regions from the estimation of the new intensity values W, since the latter do not represent reliable intensity information about the imaged papillary structure and could therefore distort the estimation of the intensity values W. In effect, the discrete intensity domain DI of the digital papillary structure signal PS maps a considerably larger portion of the continuous intensity domain KI of the intensity profile IP than the portions A1, A2 detected by the digital signals DS1, DS2 and has twice the intensity resolution in the overlapping area of the portions A1 and A2. The discrete intensity domain DI of the digital papillary structure signal PS thus represents a considerably better approximation of the intensity profile IP in comparison with the portions A1, A2 of the digital signals DS1, DS2.

In a first variant of the inventive exemplary embodiment just described, which is not shown explicitly in the figures, the portions A1, A2 do not overlap and are directly adjacent. The combination of the corresponding digital signals DS1, DS2 produces a digital papillary structure signal PS whose discrete intensity domain DI covers a portion of the continuous intensity domain KI that is twice as large as each single digital signal DS1, DS2. The resolution of said intensity domain DI, however, is equal to that of the single intensity domain portions A1, A2 of the digital signals DS1, DS2. Correspondingly, with sufficiently large or a sufficient number of portions A1, A2 the total continuous intensity domain KI of the intensity profile IP can be covered by the discrete intensity domain DI of the papillary structure signal PS with constant intensity resolution.

In a second variant of the exemplary embodiment described with respect to FIG. 1, which is not shown explicitly in the figures, identical portions A1 and A2 with different resolutions are selected instead of different portions A1, A2 with the same resolution. In this case, the discrete intensity domain DI of the digital papillary structure signal PS maps only this intensity domain portion, but its intensity resolution is substantially higher than with the portions A1, A2. If the portions A1 and A2 are partitioned into $a_1$ and $a_2$ different discrete intensity values W1, W2, the discrete intensity domain DI comprises at most $a_1+a_2-1$ different intensity values W.

Finally, the exemplary embodiment according to FIG. 1 can also be modified in such a way that different portions with different resolutions are combined into a digital papillary structure signal.

Figure 2:
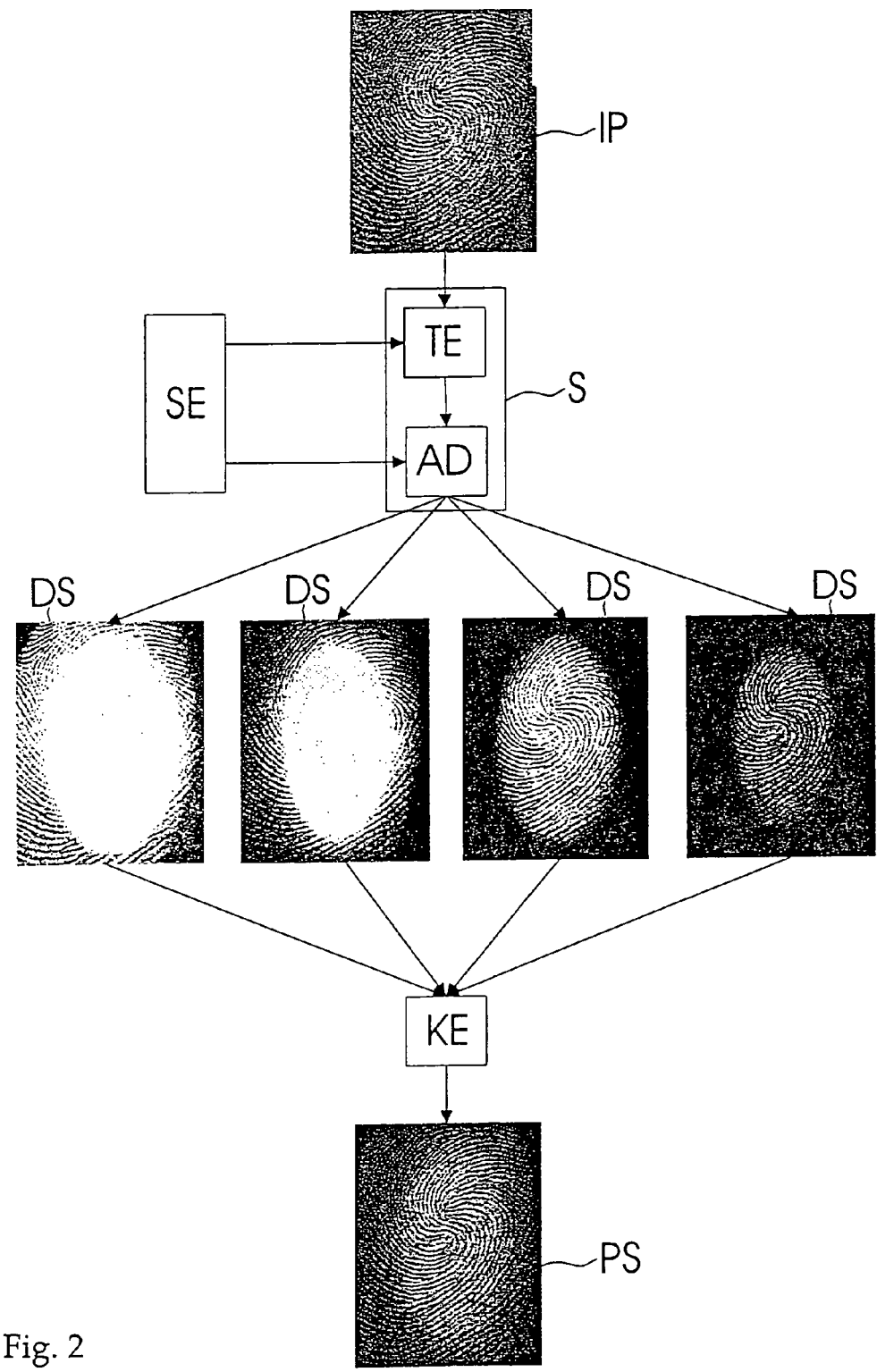

FIG. 2 shows, with an apparatus for digitizing intensity profiles IP of a fingerprint by means of a sensor S, another exemplary embodiment of the invention which maps continuous (analog) images as binary digital image signals DS, i.e. as those digital image signals DS having only two different intensity values, "white" and "black".

The sensor S comprises a transformation device TE or a signal converter which transforms the intensity profile IP of an input image into an analog electrical signal, and an analog/digital converter AD which finally converts the analog electrical signal into one or more digital signals by scanning its space domain and/or intensity domain.

Both the transformation of the transformation device TE and that of the A/D converter AD are controlled by the control device SE. The latter determines the particular portion of the intensity domain of the intensity profile IP to be detected by a digital image signal DS, on the one hand, and it determines the resolution with which said intensity portions are quantized in each case, on the other hand. In doing so, the control device SE can cause either the transformation device TE or the A/D converter AD to detect a certain portion of the continuous intensity domain upon recording and digitization of the intensity profile IP of the papillary structure. The control device can be realized both as a separate component and as an integral part of the transformation device TE and/or of the A/D converter AD.

The actual digitization of the analog intensity profile IP, consisting of the discretization of space domain and/or intensity domain, is then effected by the A/D converter AD. The quantization, that is, the scanning of the intensity domain portion and its resolution, is likewise specified by the control device SE.

According to another exemplary embodiment shown in FIG. 2, the sensor S produces binary digital image signals DS, the scanning of the continuous intensity domain with two discrete intensity values being specified by the control device SE by means of a threshold value, the so-called binarization threshold. Said threshold value partitions the continuous intensity domain of the analog intensity profile IP to be digitized into a "dark" intensity segment, which is mapped to the binary intensity value 0 in the digital image signal DS, and a "bright" intensity segment, which is mapped to the intensity value 1. Upon production of such a binary digital image signal DS all those discrete image positions (pixels) are thus given the binary value 1 whose continuous intensity domain in the intensity profile IP of the corresponding image area has a mean intensity value located in the bright intensity segment determined by the binarization threshold.

To produce from binary digital image signals DS a papillary structure signal PS having a high intensity resolution, a sequence of binary digital image signals DS is produced and the binarization threshold thereby successively increased or reduced or changed in another order, in order to incrementally scan the total continuous intensity domain in this way. Upon the subsequent combination of the different discrete intensity domains of the binary digital image signals DS by the combination device KE, new, smaller intensity intervals result from the superimposition of the particular intensity segments of the digital image signals DS. The combination device KE then assigns to each of said intensity intervals a new, more exact discrete intensity value. This is done in the present embodiment by simple addition of all digital image signals DS by the combination device KE. Thus, the resulting intensity value for each single pixel of the papillary structure signal PS is exactly the number of all digital image signals DS carrying the binary value 1 at the corresponding pixel.

If the control device SE has produced n digital image signals DS with different binarization thresholds, the combination device KE produces a digital papillary structure signal PS with n+1 different discrete intensity values.

The invention claimed is:

1. A method for digitizing at least a subarea of the papillary structure of skin, the subarea defining an intensity profile with a continuous intensity domain, comprising the steps of:
    transforming the intensity profile into at least one analog electrical signal, and
    transforming said analog electrical signal into at least one digital signal with an intensity domain comprising discrete intensity values and a space domain comprising discrete positions,
    repeatedly performing the steps of transforming the intensity profile into at least one analog electrical signal and of transforming said analog electrical signal into at least one digital signal with an intensity domain comprising intensity values and a space domain comprising discrete positions for the same subarea to form different digital signals with different intensity discretizations in each case, and
    combining the different digital signals into a common digital papillary structure signal with an intensity domain formed from discrete intensity values and a space domain formed from discrete positions in such a way that the intensity domain of the papillary structure signal has more intensity values than the intensity domains of each single one of the different digital signals.

2. The method according to claim 1, wherein the repeated performing of the transforming steps is done for different portions of the continuous intensity domain in each case, so that after the combining step the intensity domain of the digital papillary structure signal covers a larger portion of the continuous intensity domain than the intensity domains of each single one of the digital signals.

3. The method according to claim 2, wherein the portions of the continuous intensity domain together cover the total continuous intensity domain.

4. The method according to claim 2, wherein the portions of the continuous intensity domain are adjacent and do not overlap.

5. The method according to claim 2, wherein the portions of the continuous intensity domain overlap.

6. The method according to claim 2, wherein the combining step comprises before the estimating and entering substeps the following substep:
    normalizing the intensity domains of the digital signals to the portion of the continuous intensity domain detected in the respective digital signal.

7. The method according to claim 6, wherein upon the estimating step, only those discrete intensity values of the accordingly corresponding positions of the digital signals are taken into account that do not represent a maximum or minimum intensity value of the respective digital signal.

8. The method according to claim 2, wherein upon the repeated performing of the transforming steps, the portions of the continuous intensity domain are determined upon transforming the analog electrical signal into a digital signal.

9. The method according to claim 8, wherein the determination of the second and the further portions is carried out by using data of the previous portion or portions.

10. The method according to claim 8, wherein the number of intensity values is determined by the choice or number of portions.

11. The method according to claim 2, wherein upon the repeated performing of the transforming steps, the portions of the continuous intensity domain are determined upon transforming the intensity profile into the analog electrical signal.

12. The method according to claim 11, wherein the determination of the second and the further portions is carried out by using data of the previous portion or portions.

13. The method according to claim 11, wherein the number of intensity values is determined by the choice or number of portions.

14. The method according to claim 11, wherein the transforming of the intensity profile into an analog electrical signal is done by a capacitive signal converter, and the portion of the continuous intensity domain is determined by quantities of charge applied to capacitors of the capacitive signal converter.

15. An apparatus for digitizing at least a subarea of the papillary structure of skin, the subarea defining an intensity profile with a continuous intensity domain, comprising a transformation device for transforming the intensity profile into at least one analog electrical signal, and an analog/digital converter for transforming said analog electrical signal into at least one digital signal with an intensity domain comprising discrete intensity values and a space domain comprising discrete positions,
    a control device which causes the transformation device and the analog/digital converter to perform for the same sub area,
    the transforming of the intensity profile into at least one analog electrical signal and the transforming of the analog electrical signal into at least one digital signal with an intensity domain comprising discrete intensity values and a space domain comprising discrete positions for the same subarea repeatedly to form different digital signals with different intensity discretizations in each case, and
    a combination device which combines the digital signals into a common digital papillary structure signal with an intensity domain comprising discrete intensity values and a space domain comprising discrete positions in such a way that the intensity domain of the digital papillary structure signal has more discrete intensity values than the intensity domains of each single one of the digital signals.

16. The apparatus according to claim 15, wherein
    the control device is arranged to determine in each case different portions of the continuous intensity domain of the intensity profile to be mapped to the intensity domain of the respective digital signal, and
    the combination device is arranged to combine the digital signals in such a way that the intensity domain of the digital papillary structure signal covers a larger portion of the continuous intensity domain than the intensity domains of each single one of the digital signals.

17. The apparatus according to claim 16, including means for mapping a portion to be mapped of the continuous intensity domain of the intensity profile as determined by the control device to the analog electrical signal upon transformation of the intensity profile by the transformation device.

18. The apparatus according to claim 16, wherein the transformation device is a capacitive signal converter.

19. The apparatus according to claim 16, including means for mapping a portion to be mapped of the continuous intensity domain of the intensity profile as determined by the control device to a digital signal upon transformation of the analog electrical signal by the analog/digital converter.

20. The apparatus according to claim 16, wherein the control device is arranged to adjust the portions to be mapped of the continuous intensity domain of the intensity profile in such a way that they altogether cover the total continuous intensity domain.

21. The apparatus according to claim 16, wherein the combination device, before estimation of the discrete intensity values of the digital papillary structure signal, is arranged to normalize the intensity domains of the digital signals to the portion of the continuous intensity domain detected in the respective digital signal.

22. The apparatus according to claim 21, wherein the combination device, upon estimation of the discrete intensity values of the digital papillary structure signal, is arranged to take into account only those intensity values of the accordingly corresponding discrete positions of the digital signals that do not represent either the maximum or the minimum intensity value of the particular intensity domain.

* * * * *